United States Patent
Steffl et al.

(10) Patent No.: US 11,875,209 B2
(45) Date of Patent: Jan. 16, 2024

(54) CONNECTION AND SERVICE DISCOVERY FOR FINE RANGING APPLICATIONS

(71) Applicant: ASSA ABLOY AB, Stockholm (SE)

(72) Inventors: Jan Steffl, Senomaty (CZ); Sylvain Jacques Prevost, Austin, TX (US); Fredrik Carl Stefan Einberg, Huddinge (SE); Hans-Juergen Pirch, Feldkirchen (AT)

(73) Assignee: ASSA ABLOY AB, Stockholm (SE)

( * ) Notice: Subject to any disclaimer, the term of this patent is extended or adjusted under 35 U.S.C. 154(b) by 154 days.

(21) Appl. No.: 17/250,903

(22) PCT Filed: Oct. 1, 2020

(86) PCT No.: PCT/EP2020/077522
§ 371 (c)(1),
(2) Date: Mar. 24, 2021

(87) PCT Pub. No.: WO2021/064102
PCT Pub. Date: Apr. 8, 2021

(65) Prior Publication Data
US 2022/0309308 A1    Sep. 29, 2022

Related U.S. Application Data

(60) Provisional application No. 62/908,839, filed on Oct. 1, 2019.

(51) Int. Cl.
*G06K 19/07* (2006.01)
*H04W 4/70* (2018.01)
(Continued)

(52) U.S. Cl.
CPC .......... *G06K 19/0723* (2013.01); *H04W 4/70* (2018.02); *H04W 4/80* (2018.02); *H04W 8/005* (2013.01); *H04W 76/14* (2018.02); *H04W 88/06* (2013.01)

(58) Field of Classification Search
CPC ...................................................... H04W 4/80
See application file for complete search history.

(56) References Cited

U.S. PATENT DOCUMENTS 7,499,674 B2    3/2009    Salokannel et al.
7,597,250 B2    10/2009    Finn
(Continued)

FOREIGN PATENT DOCUMENTS

CN    1692368    11/2005
CN    202703516    1/2013
(Continued)

OTHER PUBLICATIONS

"Indian Application Serial No. 202117020733, First Examination Report dated May 5, 2022", 5 pgs.
(Continued)

*Primary Examiner* — Wen W Huang
(74) *Attorney, Agent, or Firm* — Schwegman Lundberg & Woessner, P.A.

(57) ABSTRACT

Various systems and methods for providing discovering smart card slots in a device are described herein. A server device for discovering smart card slots in a client device may be implemented with a processor subsystem; and memory including instructions, which when executed by the processor subsystem, cause the processor subsystem to perform operations comprising: receiving, at the server device from the client device, over an established Bluetooth connection, smart card connector parameters, the client device having a plurality of smart card slots; iterating through the plurality of smart card slots; at each slot of the plurality of smart card slots, using a smart card protocol to attempt to access an application at each slot, the application pre-associated with the server device; and in response to identifying the appli- (Continued)

cation exists in a slot of the plurality of smart card slots, connecting with the application.

20 Claims, 6 Drawing Sheets

(51) Int. Cl.
*H04W 76/14* (2018.01)
*H04W 4/80* (2018.01)
*H04W 8/00* (2009.01)
*H04W 88/06* (2009.01)

(56) References Cited

U.S. PATENT DOCUMENTS

| | | |
|---|---|---|
| 7,756,002 B2 | 7/2010 | Batra et al. |
| 7,881,746 B2 | 2/2011 | Desai |
| 7,995,644 B2 | 8/2011 | Sahinoglu et al. |
| 8,355,671 B2 | 1/2013 | Kramer et al. |
| 8,478,360 B2 | 7/2013 | Soliman |
| 8,736,438 B1 | 5/2014 | Vasquez et al. |
| 8,913,599 B2 | 12/2014 | Gonikberg et al. |
| 9,408,147 B2 | 8/2016 | Polo et al. |
| 9,530,265 B2 | 12/2016 | Lee et al. |
| 9,666,005 B2 | 5/2017 | Ellis et al. |
| 9,721,404 B2 | 8/2017 | Muller |
| 9,769,627 B2 | 9/2017 | Siswick et al. |
| 9,942,849 B1 | 4/2018 | Hariharan et al. |
| 10,117,046 B2 | 10/2018 | Ledvina et al. |
| 10,171,129 B1 | 1/2019 | Hammerschmidt et al. |
| 10,318,850 B1* | 6/2019 | Gosalia ............... G06K 13/085 |
| 10,356,553 B2 | 7/2019 | Sant et al. |
| 10,486,646 B2 | 11/2019 | Ledvina et al. |
| 10,567,034 B2 | 2/2020 | Hammerschmidt et al. |
| 10,602,556 B2 | 3/2020 | Foster et al. |
| 10,652,925 B2 | 5/2020 | Naguib et al. |
| 10,660,037 B2 | 5/2020 | Hariharan et al. |
| 10,759,389 B2 | 9/2020 | Ledvina et al. |
| 10,819,029 B2 | 10/2020 | Amiri et al. |
| 2003/0232620 A1 | 12/2003 | Runkle et al. |
| 2004/0176134 A1* | 9/2004 | Goldthwaite ....... H04L 12/2854 455/558 |
| 2008/0011851 A1 | 1/2008 | Adams et al. |
| 2010/0090000 A1* | 4/2010 | Varone ................. H04W 92/08 235/382 |
| 2013/0023207 A1* | 1/2013 | Chen .................... H04W 8/183 455/41.1 |
| 2013/0065557 A1* | 3/2013 | Zhang .................. H04W 12/04 455/411 |
| 2014/0026213 A1 | 1/2014 | Antebi et al. |
| 2014/0355582 A1 | 12/2014 | Kamath et al. |
| 2015/0310681 A1 | 10/2015 | Avery et al. |
| 2015/0332532 A1 | 11/2015 | Lee et al. |
| 2016/0080932 A1* | 3/2016 | Jin ....................... H04W 8/183 455/418 |
| 2016/0234008 A1 | 8/2016 | Hekstra et al. |
| 2016/0241999 A1 | 8/2016 | Chin et al. |
| 2016/0278006 A1 | 9/2016 | Lee et al. |
| 2016/0316500 A1 | 10/2016 | Aliyar |
| 2016/0353233 A1 | 12/2016 | Yong et al. |
| 2016/0360341 A1 | 12/2016 | Srivatsa et al. |
| 2017/0070919 A1 | 3/2017 | Verger et al. |
| 2017/0151918 A1 | 6/2017 | Boesen |
| 2017/0153636 A1 | 6/2017 | Boesen |
| 2017/0158202 A1 | 6/2017 | Yang |
| 2017/0232930 A1 | 8/2017 | Murar et al. |
| 2017/0236346 A1 | 8/2017 | Murar et al. |
| 2019/0097317 A1 | 3/2019 | Di Nallo et al. |
| 2019/0098499 A1* | 3/2019 | Lerch .................. H04W 76/10 |
| 2019/0116619 A1 | 4/2019 | Hauck et al. |
| 2020/0053689 A1 | 2/2020 | Mcqueen et al. |
| 2020/0150261 A1 | 5/2020 | Naguib et al. |
| 2020/0259522 A1 | 8/2020 | Hammerschmidt et al. |
| 2020/0320188 A1 | 10/2020 | Graff et al. |
| 2020/0351781 A1 | 11/2020 | Hariharan et al. |

FOREIGN PATENT DOCUMENTS

| | | |
|---|---|---|
| CN | 104066075 | 9/2014 |
| CN | 107079239 | 8/2017 |
| CN | 108966118 | 12/2018 |
| EP | 1563445 A1 | 8/2005 |
| EP | 2938107 A1 | 10/2015 |
| EP | 2617242 | 10/2016 |
| EP | 3101874 | 12/2016 |
| EP | 3404943 A1 | 11/2018 |
| IN | 202117020733 | 4/2022 |
| JP | 2010501953 | 1/2010 |
| JP | 6205237 | 9/2017 |
| JP | 7108137 | 7/2022 |
| JP | 2022536433 | 7/2022 |
| JP | 2022153468 | 10/2022 |
| KR | 20050074948 | 7/2005 |
| KR | 101077406 | 10/2011 |
| KR | 20170040240 | 4/2017 |
| KR | 102464259 | 11/2022 |
| WO | 2013178163 | 12/2013 |
| WO | 2016007627 | 1/2016 |
| WO | 2016059451 | 4/2016 |
| WO | 2017136725 | 8/2017 |
| WO | 2017144345 | 8/2017 |
| WO | WO-2017212499 A1 | 12/2017 |
| WO | 2018071671 | 4/2018 |
| WO | 2021064102 | 4/2021 |

OTHER PUBLICATIONS

"Japanese Application Serial No. 2022-112995, Voluntary Amendment filed Aug. 19, 2022", w/ English Translation, 6 pgs.
"Canadian Application Serial No. 3,118,991, Voluntary Amendment filed Sep. 14, 2022", 22 pgs.
"Indian Application Serial No. 202117020733, Response Filed Nov. 4, 2022 to First Examination Report dated May 5, 2022", w/ English Claims, 20 pgs.
"Indian Application Serial No. 202117020733, Voluntary Amendment Filed Nov. 4, 2022", w/ English Claims, 13 pgs.
"Canadian Application Serial No. 3,118,991, Examiner's Rule 86(2) Report dated Dec. 19, 2022", 4 pgs.
"European Application Serial No. 20789870.1, Response to Communication pursuant to Rules 161(1) and 162 EPC filed Dec. 10, 2021", 14 pgs.
"Canadian Application Serial No. 3,118,991, Office Action dated Dec. 14, 2021", 4 pgs.
"Korean Application Serial No. 10-2021-7009616, Notice of Preliminary Rejection dated Feb. 25, 2022", w/ English Translation, 8 pgs.
"Canadian Application Serial No. 3,118,991, Response Filed Apr. 12, 2022 to Office Action dated Dec. 14, 2021", 26 pgs.
"Korean Application Serial No. 10-2021-7009616, Response filed Apr. 7, 2022 to Notice of Preliminary Rejection dated Feb. 25, 2022", w/ English Translation of Claims, 16 pgs.
"International Application Serial No. PCT/EP2020/077522, International Preliminary Report on Patentability dated Apr. 5, 2022", 8 pgs.
"International Application Serial No. PCT/EP2020/077522, International Search Report dated Feb. 2, 2021", 5 pgs.
"International Application Serial No. PCT/EP2020/077522, Written Opinion dated Feb. 2, 2021", 7 pgs.
"European Application Serial No. 20789870.1, Invitation pursuant to Article 94(3) and Rule 71(1) EPC dated Jan. 30, 2023", 5 pgs.
"European Application Serial No. 20789870.1, Response Filed Mar. 8, 2023 to Invitation pursuant to Article 94(3) and Rule 71(1) EPC dated Jan. 30, 2023", 19 pgs.
"Canadian Application Serial No. 3,118,991, Response Filed to Examiner's Rule 86(2) Report dated Dec. 19, 2022", 37 pgs.

(56) References Cited

OTHER PUBLICATIONS

"Japanese 2022-112995 Notification of Reasons for Refusal dated Jun. 6, 2023", with English translation, 6 pages.
"Chinese Application Serial No. 202080006217.7, Office Action dated Sep. 9, 2023", with English translation, 15 pages.

* cited by examiner

CONNECTION AND SERVICE DISCOVERY FOR FINE RANGING APPLICATIONS

PRIORITY APPLICATION

This application claims priority to U.S. Provisional Application Ser. No. 62/908,839, filed Oct. 1, 2019, the disclosure of which is incorporated herein in its entirety by reference.

TECHNICAL FIELD

Embodiments described herein generally relate to wireless connectivity, and in particular, to connection and service discovery for fine ranging applications.

BACKGROUND

Bluetooth Low Energy (BLE) is a wireless technology standard that provides the capability to exchange data between devices over short distances. Operating over an unlicensed portion of the frequency spectrum, BLE has been widely adopted for personal area networks, such as between a mobile device and headphones.

Ultra-Wideband (UWB) communications is a newer standard that operates in a different part of the radio spectrum than BLE. As such, UWB can coexist with BLE. UWB is a radio frequency (RF) technique that uses short, low power, pulses over a wide frequency spectrum. The pulses are on the order of millions of individual pulses per second. The width of the frequency spectrum is generally greater than 500 megahertz or greater than twenty percent of an arithmetic center frequency.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
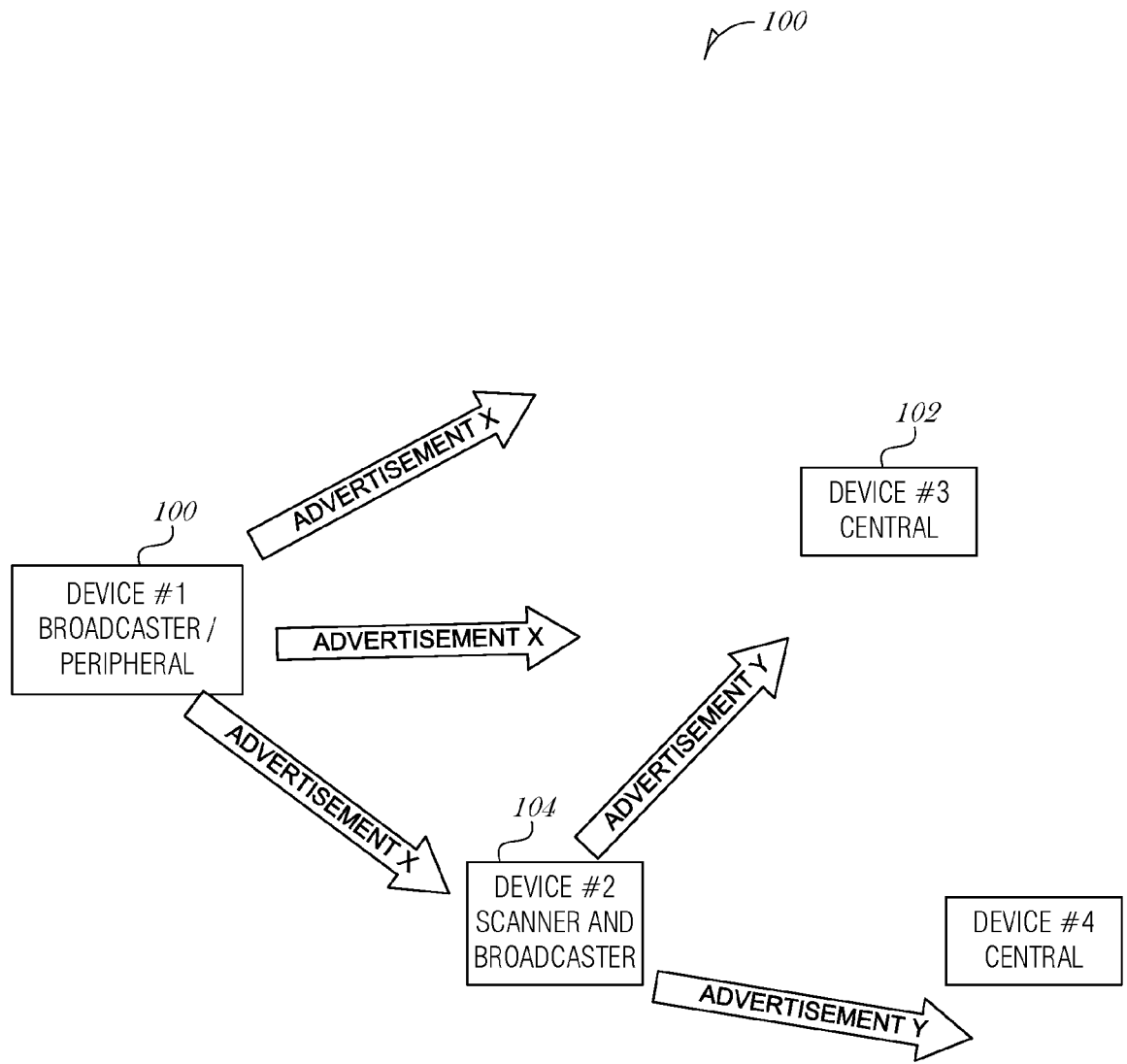
FIG. 1 is a block diagram illustrating a BLE operating environment, according an embodiment.

In the following description, for purposes of explanation, numerous specific details are set forth in order to provide a thorough understanding of some example embodiments. It will be evident, however, to one skilled in the art that the present disclosure may be practiced without these specific details.

Both BLE and UWB can be used for ranging applications. At a very high level, a ranging application is one that is used to determine a distance between two devices. While BLE can be used for coarse ranging with RSSI (Received Signal Strength Indicator), UWB, because of its implementation, is better suited for fine ranging. Better resolution in ranging is advantageous for many reasons.

For instance, in a physical access control application, being able to track a person's location in a building down to the inch, or even finer grained, provides a more accurate mechanism when locking or unlocking doors to prevent or allow access. As another example, in a mobile payment scenario, when a buyer and seller are near each other in physical proximity, such as in at a point-of-sale terminal, there is an additional layer of confidence that the transaction is valid, and the buyer's payment credentials may be transmitted to the seller. Other advantages exist for UWB in seamless access control, location-based services, and peer-to-peer services.

However, in present implementations, due to power requirements, UWB is not ideal for in-band discovery. Devices that use UWB would quickly expend their power reserves while monitoring for connections. Instead, UWB requires parameters for the connection exchanged before the session. In order to address these limitations, BLE may be used to detect device and available connections, pass the UWB parameters, and provide lower power requirements for in-band discovery. BLE may also be used to exchange identification parameters for security. Further, combining BLE and UWB provides the advantage of using a well-defined, widespread connection standard (BLE) with an improved ranging technology (UWB). Additional details in the following sections.

Communication over non-standardized BLE Generic Attribute Profile (GATT) is not defined by the Bluetooth Special Interest Group (SIG). Instead, protocol and sequencing of data exchange is entirely service specific. What is needed is a UWA service to provide fine ranging (FiRa) applications that rely on UWB technology.

In a FiRa use case, the devices need to exchange UWB parameters and FiRa service specific data, such as a physical access credential, to establish a connection. This may be in the form of a session key, which may be used for a handshake or discovery of the FiRa service or application.

In BLE, a device that transmits advertising packets is referred to as an broadcaster or peripheral device and devices that receive advertising packets on the advertising channels are known as a scanner or central device. When a scanner receives an advertising packet of interest, then the scanner may request a connection over the same advertising radio frequency (RF) channel on which it received the connectable advertising packet. A scanner may make a request to connect to the advertising broadcaster device, and once the connection is established, the scanner controls aspects of the communication.

FIG. 1 is a block diagram illustrating a BLE operating environment, according an embodiment. FIG. 1 illustrates a first device 100, which acts as a BLE broadcaster/peripheral, and a second device 102, which acts as a BLE central device. It is understood that one or more intermediate devices 104 may exist between the first device 100 and second device 102, acting as scanners and relay advertisements from the first device 100. As is known in the BLE protocol, scanners may add their own advertisements, and therefore may act as both scanners and broadcasters.

Figure 2:
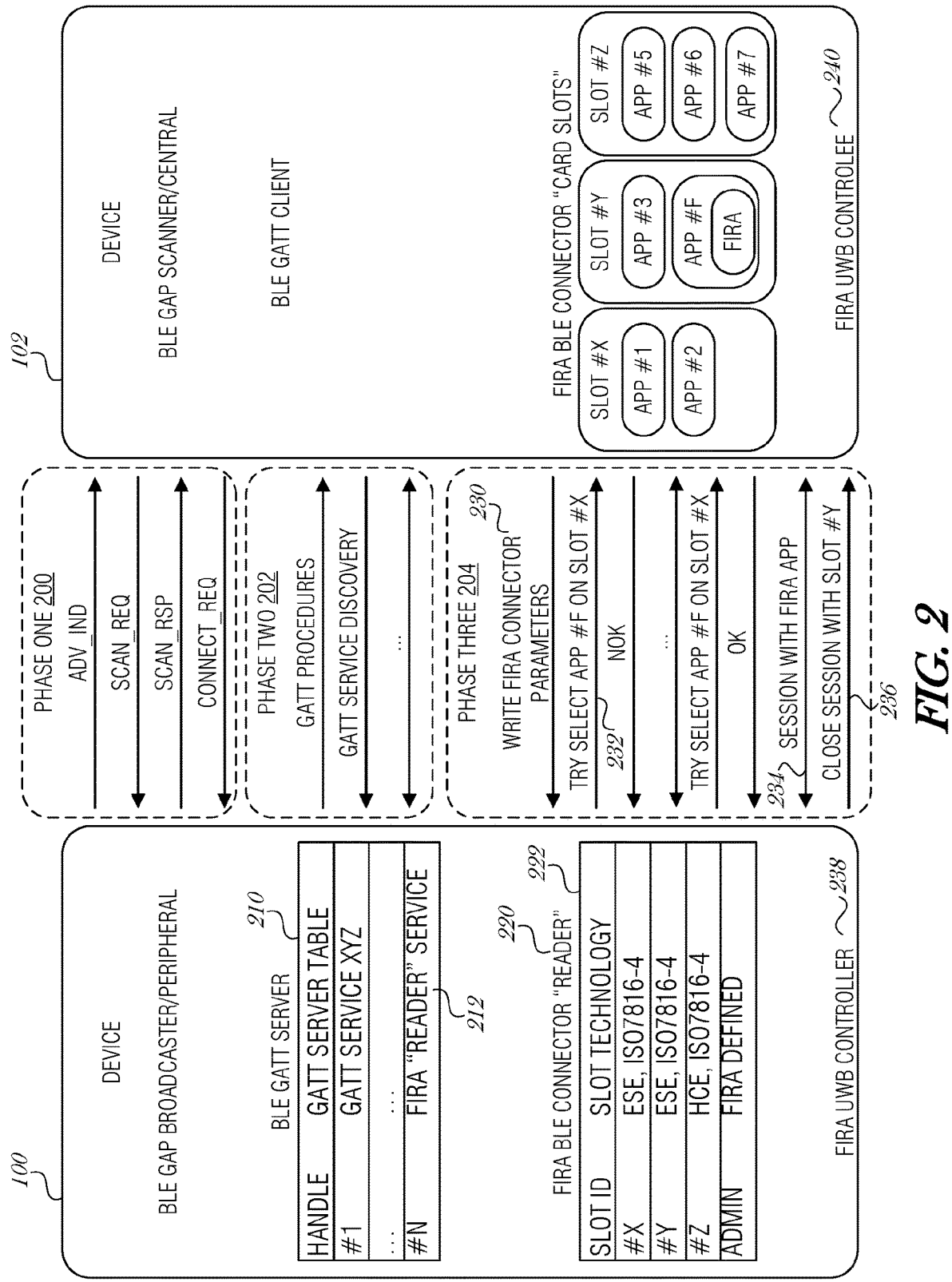
FIG. 2 is a block diagram illustrating control and data flow during connection and service discovery, according an embodiment.

FIG. 2 is a block diagram illustrating control and data flow during connection and service discovery, according an embodiment. In Phase One (200), the first device 100 advertises its presence with a BLE advertising message ADV_IND. The connection being advertised is subject to the Generic Access Profile (GAP). GAP defines how BLE-enabled devices make themselves available and how two devices can communicate directly with each other. When the second device 102 responds to initiate a connection using a SCAN_REQ message, the second device 102 is able to perform service discovery based on a GATT hosted at the first device 100 by analyzing the SCAN_RSP message sent by the first device 100. The CONNECT_REQ message is a connection request packet sent by the central device (second device 102) to connect to the peripheral device (first device 100).

In Phase Two (202), GATT service discovery is performed. The BLE Attribute Protocol (ATT) defines the communication between the first device 100 and the second device 102. ATT identifies the device discovery, and reading and writing attributes on another device. The GATT is built on top of the ATT and is used to provide high-level services. The first device 100 maintains a set of attributes, which are data structures that store information managed by the GATT. The second device 102 may access the attributes by querying the first device 100. As illustrated in FIG. 2, one of the GATT services in the GATT Server Table 210 is a FiRa "reader" service 212.

In order to provide easier connectivity, the BLE standard is bridged to a smart card standard, such as ISO/IEC 7816. The ISO/IEC 7816 generally specifies the physical characteristics of integrated circuit cards with contacts (i.e., smart cards). The ISO/IEC 7816 standard also defines the data elements, and commands and mechanisms for security operations, card management, and application management.

The second device 102 may have one or more smart card slots. The smart card slots may be physical slots or virtual slots. When interfacing with the first device 100, the second device 102 may expose the smart card slots and allow a FiRa BLE connector reader 220 to communicate with an application executing in the smart card slot. The smart card slots may be physical slots or may be emulated (virtual) slots. Cards that are inserted or loaded into the slots may have one or more applications stored on them. A FiRa ranging application that uses UWB ranging may be one of the applications. In such an embodiment, the ISO/IEC 7816 standard provides session security protocols that are used to secure the UWB ranging session.

In Phase Three 204, a FiRa BLE connector reader 220 operating on the first device 100 is provided FiRa connector parameters by the second device 102 (operation 230). The FiRa BLE connector reader 220 may maintain a data structure of the connector parameters (222). Using the connection parameters, the FiRa BLE connector reader 220 interrogates each slot on the second device 102, in an attempt to find the slot with a FiRa application (operations 232). Once the FiRa application is found, the FiRa BLE connector reader 220 creates a session with the FiRa application (operation 234) and conducts FiRa operations. Note that the FiRa BLE connector reader 220 may perform several sequential interactions with multiple smart card applications on a single card slot, or across several card slots. After the session is complete, the FiRa BLE connector reader 220 closes the session with the slot that hosted the FiRa application (operation 236).

The FiRa UWB controller 238 and FiRa UWB controlee 240 are UWB hardware (e.g., radios, controllers, memory devices, oscillators, interconnect circuitry, etc.), which are engaged after the FiRa data exchange. The FiRa UWB controller 238 and FiRa UWB controlee 240 pass signals between one another to perform ranging or measuring their exact distance apart. UWB ranging uses time of flight (ToF) from the time a polling message is sent to when a response message is received.

The FiRa UWB controller 238 acts as a transmitter and sends billions of pulses across the wide spectrum frequency to the FiRa UWB controlee 240. The FiRa UWB controlee translates the pulses into data by listening for a familiar pulse sequence sent by the transmitter. Pulses are sent about one every two nanoseconds, which helps UWB achieve its real-time accuracy.

The UWB hardware may include multiple-input and multiple-output (MIMO) distributed antenna system. This increases the range and reliability of reception. Based on the IEEE 802.15.4a standard, UWB can determine the relative position of peer devices with line of sight at up to 200 meters.

The UWB session is independent of the BLE session. The BLE session may be terminated while the UWB ranging is ongoing. Alternatively, the BLE session and application may be used while the UWB ranging is taking place. In effect, BLE is used for out-of-band communications to negotiate the UWB RF parameters and share a temporary session key (e.g., using a security token service or STS seed). At this point the out-of-band communication channel may be terminated and secure ranging with UWB is started. Using BLE for the out-of-band communications offers lower energy consumption overhead during the discovery phase. At the start of secure ranging, the two devices are not synchronized, and a receiver may consume significant power when active. Using BLE for discovery and establishment of the secure channel allows the UWB receive time to be minimized.

The first device 100 and second device 102 may be of any type of computing device. The second device 102 is typically portable in nature, and may take the form of a cellular phone, mobile device, smart phone, personal digital assistant, laptop, tablet, wearable device, portable credential card, key fob, smart card, or the like. It should be appreciated that the first device 100 does not necessarily have to take the form of a mobile device, but rather may be implemented as a part of a security monitoring device, door lock, personal computer, desktop computer, kiosk, payment terminal, beacon, smart card reader, or the like.

Figure 3:
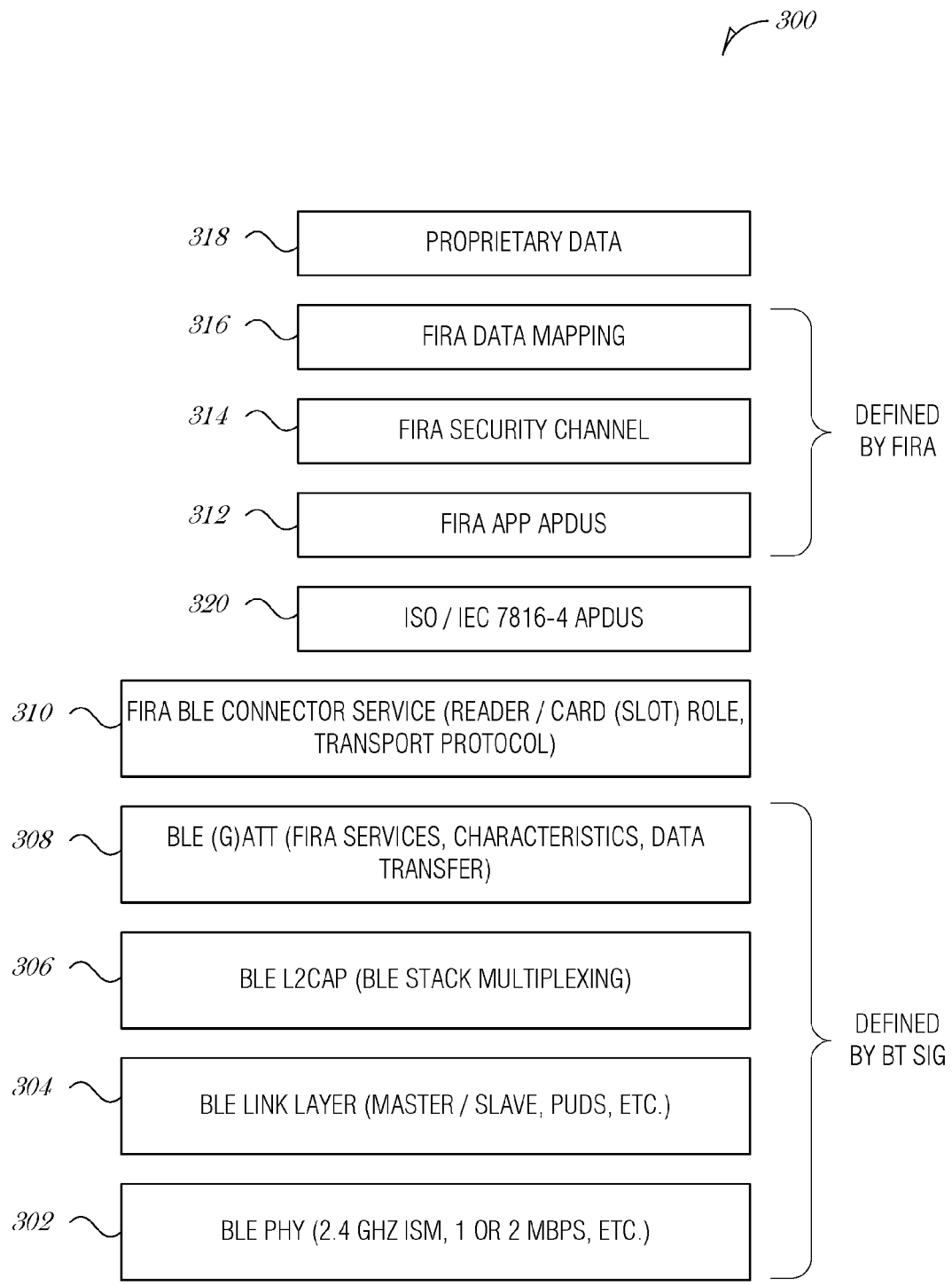
FIG. 3 illustrates a protocol stack, according to an embodiment.

FIG. 3 illustrates a protocol stack 300, according to an embodiment. At the lowest layers are the BLUETOOTH physical layer 302, link layer 304, and logical link control and adaptation protocol (L2CAP) 306. These are implemented at the BLUETOOTH controller level. The BLE Attribute Protocol (ATT) and GATT 308 are implemented in the BLUETOOTH host.

On top of the BLUETOOTH protocol stack is a FiRa BLE connector service 310 that is used to connect to a device and access the device over smart card protocols. The protocols, in an embodiment, are defined by the ISO/IEC 7816-4 Application Protocol Data Units (APDUs) 320.

Application level communication is handled using FiRa app APDUs 312, FiRa Security Channels 314, and FiRa data mapping protocols 316. Proprietary data 318 may be exchanged over the FiRa application. Such data may include UWB relevant data, such as UWB device capabilities or UWB session parameters. Other proprietary data may include a physical access control system (PACS) credential or other application or service provider data that uses the fine ranging capabilities provided by UWB. These UWB data may be device capabilities and session parameters, which are essential for UWB hardware to successfully establish the ranging session.

Figure 4:
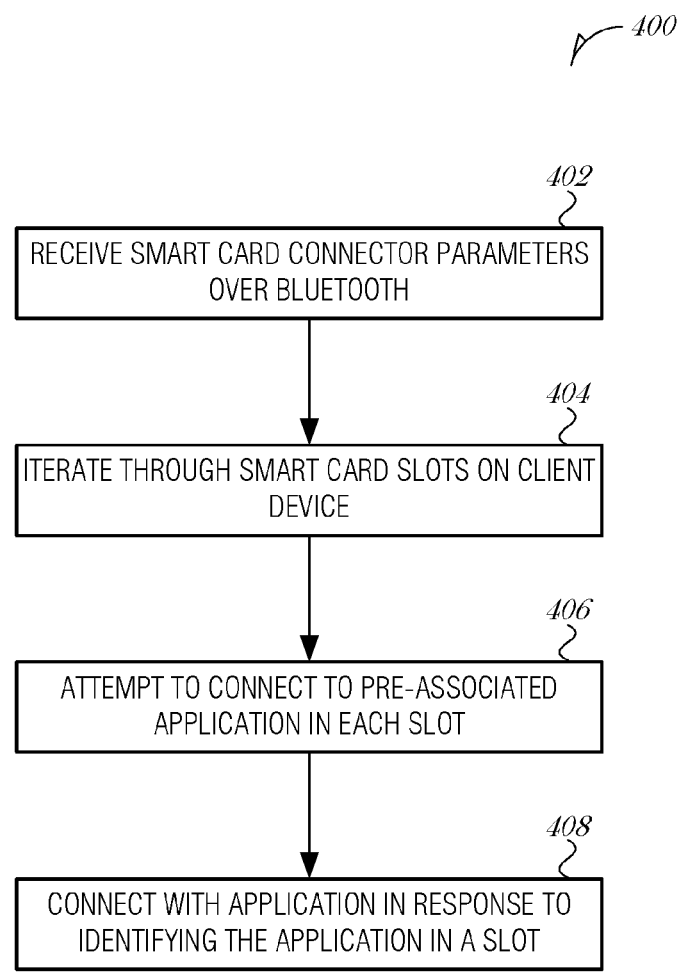
FIG. 4 is a flowchart of a method for discovering smart card slots in a device, according to an embodiment.

FIG. 4 is a flowchart of a method 400 for discovering smart card slots in a device, according to an embodiment. The method 400 begins at operation 402, smart card connector parameters are received at a server device from a client device over an established Bluetooth connection. The client device includes a plurality of smart card slots. In an embodiment, the smart card connector parameters include a buffer size. In an embodiment, the smart card connector parameters includes a flag indicating whether the client device supports multiple open slots.

At 404, the plurality of smart card slots are iterated through. Smart card slots may be physical or virtual. Thus, in an embodiment, the plurality of smart card slots include a virtual smart card slot. In another embodiment, the plurality of smart card slots include a physical smart card slot. In another embodiment, the plurality of smart card slots include a physical smart card slot and a virtual smart card slot.

In an embodiment, iterating through the plurality of smart card slots includes the operations of 1) identifying smart card types of each of the plurality of smart card slots; 2) filtering the plurality of smart card slots based on smart card types to produce filtered results; and 3) iterating through the filtered results. In various embodiments, the smart card types include embedded Secure Element (eSE) and host card emulation (HCE). As such, if the server device is configured to attempt to connect to eSE smart cards, then HCE smart cards may be filtered out and only eSE smart cards will be interrogated. Conversely, the server device may be configured to only attempt to connect to HCE smart cards.

At 406, at each slot of the plurality of smart card slots, a smart card protocol is used to attempt to access an application at each slot. In an embodiment, the smart card protocol includes ISO/IEC 7816.

The application is pre-associated with the server device, such that the server device will recognize the application through the attempt to access it. In an embodiment, the application is pre-associated with the server device when the server device is initially provisioned for field service. An application signature, identifier, or other indicia may be stored in immutable memory on the server device.

At 408, in response to identifying the application exists in a slot of the plurality of smart card slots, the server device connects to the application.

In an embodiment, the application is a fine ranging application. In a related embodiment, the application implements ultra-wideband technology to provide ranging data to the server device.

In an implementation, the BLE session is closed before UWB ranging takes place. Thus, in an embodiment, the method 400 includes disconnecting from the application and establishing an ultra-wideband ranging session using data received from the application.

Example System Components

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor. The processor subsystem may include or be implemented with one or more System on Chip (SoC) devices, such as a BLUETOOTH SoC.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 5:
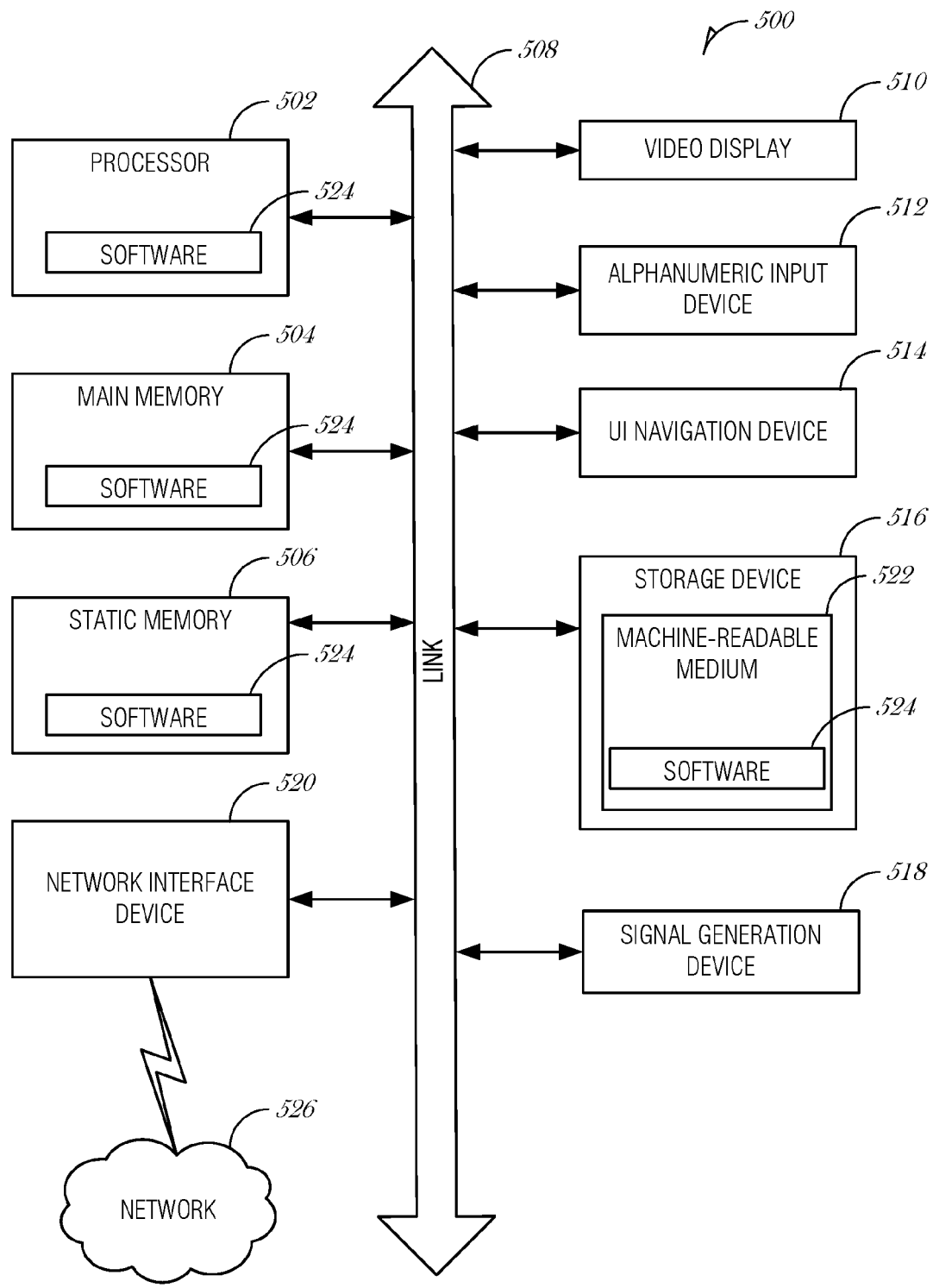
FIG. 5 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 5 is a block diagram illustrating a machine in the example form of a computer system 500, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a smart identification card, a smart credential, an electronic credential, a verifier device, a user device, a mobile device, a personal computer (PC), a tablet PC, a hybrid tablet, a personal digital assistant (PDA), a mobile telephone, a kiosk, a beacon, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, gyrometer, magnetometer, or other type of sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., BLUETOOTH, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Figure 6:
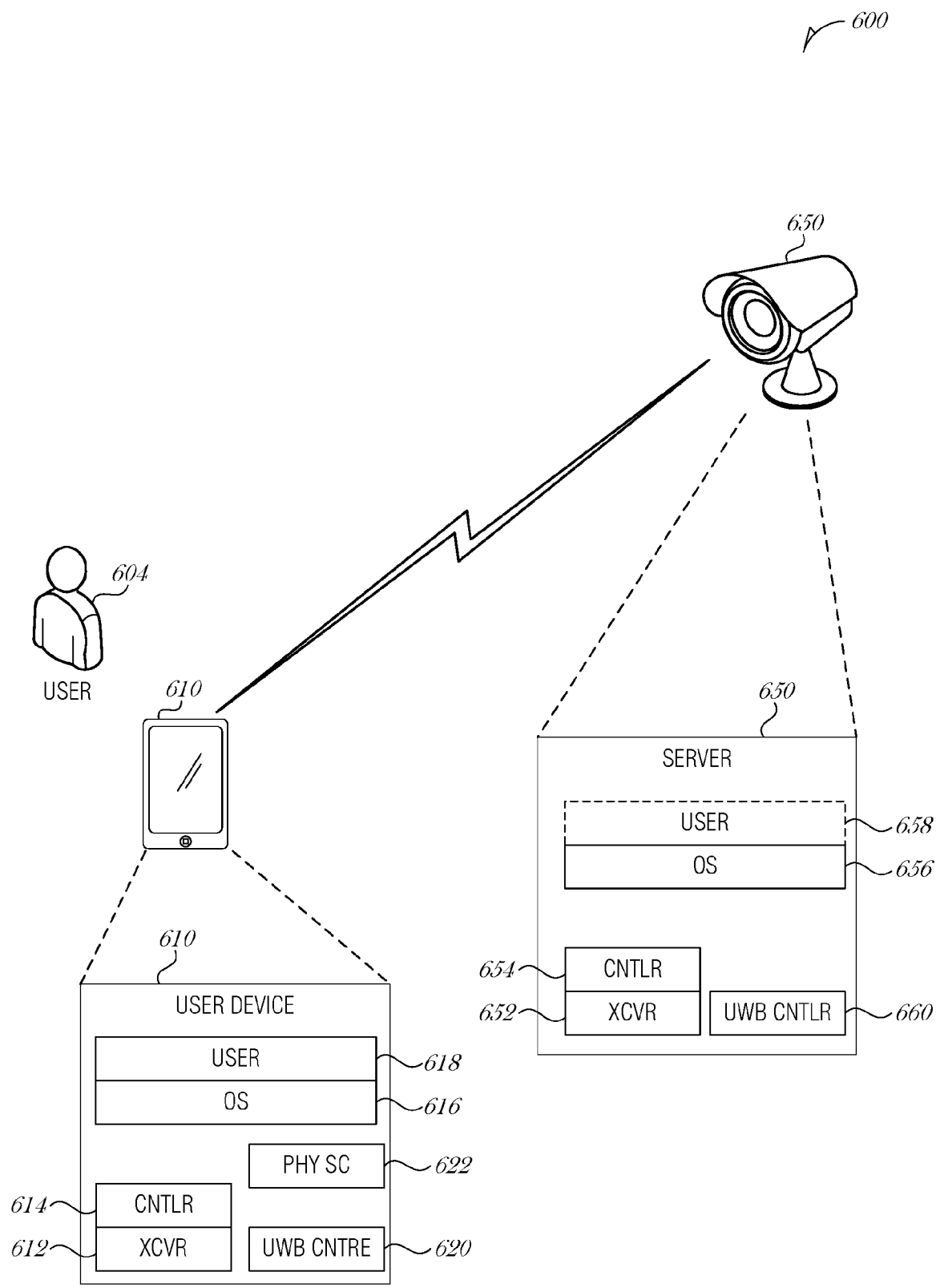
FIG. 6 is a block diagram illustrating a system upon which any one or more of the techniques (e.g., methodologies) discussed herein may perform, according to an embodiment.

FIG. 6 is a block diagram illustrating a system 600 upon which any one or more of the techniques (e.g., methodologies) discussed herein may perform, according to an embodiment. The system 600 may include a user device 610 and a server 650. The user device 610 may be an instance of the second device 102 of FIG. 1, and is typically portable in nature, and may take the form of a cellular phone, mobile device, smart phone, personal digital assistant, laptop, tablet, wearable device, portable credential card, key fob, smart card, or the like.

The server 650 may be an instance of the first device 100 of FIG. 1 and may not be a portable device. The server 650 may be implemented as a part of a security monitoring device, door lock, personal computer, desktop computer, kiosk, payment terminal, beacon, smart card reader, or the like.

The user device 610 includes a transceiver 612, capable of both sending and receiving data, and controlled by controller 614. The transceiver 612 and controller 614 may be used to communicate over various wireless networks, such as a BLUETOOTH network (e.g., according to the 802.15.1 family of standards or the BLUETOOTH Special Interest Group (SIG)), Wi-Fi network (e.g., according to the IEEE 802.11 family of standards), cellular network, such as a network designed according to the Long-Term Evolution (LTE), LTE-Advanced, 5G or Global System for Mobile Communications (GSM) families of standards, or the like.

Operating system 616 interfaces with the controller 614. Operating system 616 may be a desktop operating system, embedded operating system, real-time operating system, proprietary operating system, network operating system, and the like. Examples include, but are not limited to Windows® NT (and its variants), Windows® Mobile, Windows® Embedded, Mac OS®, Apple iOS, Apple WatchOS®, UNIX, Android™, JavaOS, Symbian OS, Linux, and other suitable operating system platforms.

A communication controller (not shown) may be implemented in hardware, firmware, or in the operating system 616. The communication controller may act as an interface with various hardware abstraction layer (HAL) interface, such as device drivers, communication protocol stacks, libraries, and the like. The communication controller is operable to receive user input (e.g., from a system event or by an express system call to the communication controller), and interact with one or more lower-level communication devices (e.g., BLUETOOTH radio, Wi-Fi radio, cellular radio, etc.) based on the user input. The communication controller may be implemented, at least in part, in a user-level application that makes calls to one or more libraries, device interfaces, or the like in the operating system 616, to cause communication devices to operate in a certain manner.

A user application space 618 on the user device 610 is used to implement user-level applications, controls, user interfaces, and the like, for a user 604 to control the user device 610. An application, app, extension, control panel, or other user-level executable software program may be used to control access to the user device 610. For example, an executable file, such as an app, may be installed on the user device 610 and operable to communicate with a host application installed on a server 650.

The server 650 may include an operating system, file system, database connectivity, radios, or other interfaces to provide services to the user device 610. In particular the server 650 may include, or be communicatively connected to, a radio transceiver 652 to communicate with the user device 610. A respective controller 654 may control the transceiver 652 of the server 650, which in turn is connected with and controlled via an operating system 656 and possible user-level applications 658. Some servers 650 may not expose user-level applications 658 and may be implemented as "headless" server.

The server 650 also includes UWB controller hardware 660, which may be used to transmit UWB signals over one or more antennas (not shown). The user device 610 also includes UWB controlee hardware 620, which responds to signals from the UWB controller hardware 660 during a UWB session.

The user device 610 also includes a physical smart card slot 622. The smart card slot 622 may support smart card types, including embedded Secure Element (eSE) smart cards. While only one physical smart card slot 622 is shown in FIG. 6, it is understood that multiple physical smart card slots may be incorporated into the device. The user device 610 may also include one or more virtual smart card slots (not shown), which expose data and applications through known smart card communication interfaces. A virtual smart card may be implemented through a trusted hardware module of the user device 610 and may be visible to the operating system 616 as a smart card that is always inserted into a physical smart card slot.

Additional Notes & Examples

Example 1 is a method for discovering smart card slots in a device, the method comprising: receiving, at a server device from a client device, over an established Bluetooth connection, smart card connector parameters, the client device having a plurality of smart card slots; iterating through the plurality of smart card slots; at each slot of the plurality of smart card slots, using a smart card protocol to attempt to access an application at each slot, the application pre-associated with the server device; and in response to identifying the application exists in a slot of the plurality of smart card slots, connecting with the application.

In Example 2, the subject matter of Example 1 includes, wherein the smart card connector parameters include a buffer size.

In Example 3, the subject matter of Examples 1-2 includes, wherein the smart card connector parameters includes a flag indicating whether the client device supports multiple open slots.

In Example 4, the subject matter of Examples 1-3 includes, wherein iterating through the plurality of smart card slots includes: identifying smart card types of each of the plurality of smart card slots; filtering the plurality of smart card slots based on smart card types to produce filtered results; and iterating through the filtered results.

In Example 5, the subject matter of Example 4 includes, wherein the smart card types include embedded Secure Element (eSE) and host card emulation (HCE).

In Example 6, the subject matter of Examples 1-5 includes, wherein the plurality of smart card slots include a virtual smart card slot.

In Example 7, the subject matter of Examples 1-6 includes, wherein the plurality of smart card slots include a physical smart card slot.

In Example 8, the subject matter of Examples 1-7 includes, wherein the plurality of smart card slots include a physical smart card slot and a virtual smart card slot.

In Example 9, the subject matter of Examples 1-8 includes, wherein the smart card protocol includes ISO/IEC 7816.

In Example 10, the subject matter of Examples 1-9 includes, wherein the application is pre-associated with the server device when the server device is initially provisioned for field service.

In Example 11, the subject matter of Examples 1-10 includes, wherein the application is a fine ranging application.

In Example 12, the subject matter of Examples 1-11 includes, wherein the application implements ultra-wideband technology to provide ranging data to the server device.

In Example 13, the subject matter of Examples 1-12 includes, disconnecting from the application; and establishing an ultra-wideband ranging session using data received from the application.

Example 14 is a server device for discovering smart card slots in a client device, comprising: a processor subsystem; and memory including instructions, which when executed by the processor subsystem, cause the processor subsystem to perform operations comprising: receiving, at the server device from the client device, over an established Bluetooth connection, smart card connector parameters, the client device having a plurality of smart card slots; iterating through the plurality of smart card slots; at each slot of the plurality of smart card slots, using a smart card protocol to attempt to access an application at each slot, the application pre-associated with the server device; and in response to identifying the application exists in a slot of the plurality of smart card slots, connecting with the application.

In Example 15, the subject matter of Example 14 includes, wherein the smart card connector parameters include a buffer size.

In Example 16, the subject matter of Examples 14-15 includes, wherein the smart card connector parameters includes a flag indicating whether the client device supports multiple open slots.

In Example 17, the subject matter of Examples 14-16 includes, wherein iterating through the plurality of smart card slots includes: identifying smart card types of each of the plurality of smart card slots; filtering the plurality of smart card slots based on smart card types to produce filtered results; and iterating through the filtered results.

In Example 18, the subject matter of Example 17 includes, wherein the smart card types include embedded Secure Element (eSE) and host card emulation (HCE).

In Example 19, the subject matter of Examples 14-18 includes, wherein the plurality of smart card slots include a virtual smart card slot.

In Example 20, the subject matter of Examples 14-19 includes, wherein the plurality of smart card slots include a physical smart card slot.

In Example 21, the subject matter of Examples 14-20 includes, wherein the plurality of smart card slots include a physical smart card slot and a virtual smart card slot.

In Example 22, the subject matter of Examples 14-21 includes, wherein the smart card protocol includes ISO/IEC 7816.

In Example 23, the subject matter of Examples 14-22 includes, wherein the application is pre-associated with the server device when the server device is initially provisioned for field service.

In Example 24, the subject matter of Examples 14-23 includes, wherein the application is a fine ranging application.

In Example 25, the subject matter of Examples 14-24 includes, wherein the application implements ultra-wideband technology to provide ranging data to the server device.

In Example 26, the subject matter of Examples 14-25 includes, wherein the operations comprise: disconnecting from the application; and establishing an ultra-wideband ranging session using data received from the application.

Example 27 is a machine-readable medium including instructions for discovering smart card slots in a device, which when executed by a machine, cause the machine to perform operations comprising: receiving, at a server device from a client device, over an established Bluetooth connection, smart card connector parameters, the client device having a plurality of smart card slots; iterating through the plurality of smart card slots; at each slot of the plurality of smart card slots, using a smart card protocol to attempt to access an application at each slot, the application pre-associated with the server device; and in response to identifying the application exists in a slot of the plurality of smart card slots, connecting with the application.

In Example 28, the subject matter of Example 27 includes, wherein the smart card connector parameters include a buffer size.

In Example 29, the subject matter of Examples 27-28 includes, wherein the smart card connector parameters includes a flag indicating whether the client device supports multiple open slots.

In Example 30, the subject matter of Examples 27-29 includes, wherein iterating through the plurality of smart card slots includes: identifying smart card types of each of the plurality of smart card slots; filtering the plurality of smart card slots based on smart card types to produce filtered results; and iterating through the filtered results.

In Example 31, the subject matter of Example 30 includes, wherein the smart card types include embedded Secure Element (eSE) and host card emulation (HCE).

In Example 32, the subject matter of Examples 27-31 includes, wherein the plurality of smart card slots include a virtual smart card slot.

In Example 33, the subject matter of Examples 27-32 includes, wherein the plurality of smart card slots include a physical smart card slot.

In Example 34, the subject matter of Examples 27-33 includes, wherein the plurality of smart card slots include a physical smart card slot and a virtual smart card slot.

In Example 35, the subject matter of Examples 27-34 includes, wherein the smart card protocol includes ISO/IEC 7816.

In Example 36, the subject matter of Examples 27-35 includes, wherein the application is pre-associated with the server device when the server device is initially provisioned for field service.

In Example 37, the subject matter of Examples 27-36 includes, wherein the application is a fine ranging application.

In Example 38, the subject matter of Examples 27-37 includes, wherein the application implements ultra-wideband technology to provide ranging data to the server device.

In Example 39, the subject matter of Examples 27-38 includes, wherein the operations comprise: disconnecting from the application; and establishing an ultra-wideband ranging session using data received from the application.

Example 40 is an apparatus for discovering smart card slots in a device, the apparatus comprising: means for receiving, at a server device from a client device, over an established Bluetooth connection, smart card connector parameters, the client device having a plurality of smart card slots; means for iterating through the plurality of smart card slots; means for, at each slot of the plurality of smart card slots, using a smart card protocol to attempt to access an application at each slot, the application pre-associated with the server device; and means for, in response to identifying the application exists in a slot of the plurality of smart card slots, connecting with the application.

In Example 41, the subject matter of Example 40 includes, wherein the smart card connector parameters include a buffer size.

In Example 42, the subject matter of Examples 40-41 includes, wherein the smart card connector parameters includes a flag indicating whether the client device supports multiple open slots.

In Example 43, the subject matter of Examples 40-42 includes, wherein the means for iterating through the plurality of smart card slots includes: means for identifying smart card types of each of the plurality of smart card slots; means for filtering the plurality of smart card slots based on smart card types to produce filtered results; and means for iterating through the filtered results.

In Example 44, the subject matter of Example 43 includes, wherein the smart card types include embedded Secure Element (eSE) and host card emulation (HCE).

In Example 45, the subject matter of Examples 40-44 includes, wherein the plurality of smart card slots include a virtual smart card slot.

In Example 46, the subject matter of Examples 40-45 includes, wherein the plurality of smart card slots include a physical smart card slot.

In Example 47, the subject matter of Examples 40-46 includes, wherein the plurality of smart card slots include a physical smart card slot and a virtual smart card slot.

In Example 48, the subject matter of Examples 40-47 includes, wherein the smart card protocol includes ISO/IEC 7816.

In Example 49, the subject matter of Examples 40-48 includes, wherein the application is pre-associated with the server device when the server device is initially provisioned for field service.

In Example 50, the subject matter of Examples 40-49 includes, wherein the application is a fine ranging application.

In Example 51, the subject matter of Examples 40-50 includes, wherein the application implements ultra-wideband technology to provide ranging data to the server device.

In Example 52, the subject matter of Examples 40-51 includes, means for disconnecting from the application; and means for establishing an ultra-wideband ranging session using data received from the application.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A server device for discovering smart card slots in a client device, comprising:
   a processor subsystem; and
   memory including instructions, which when executed by the processor subsystem, cause the processor subsystem to perform operations comprising:
      receiving, at the server device from the client device, over an established Bluetooth connection, smart card connector parameters, the client device having a plurality of smart card slots;
      using the smart card connector parameters, iterating through the plurality of smart card slots, over the Bluetooth connection, by interrogating each slot of the plurality of smart card slots using a smart card protocol to attempt to access an application at each slot, the application pre-associated with the server device; and
      in response to identifying the application exists in a slot of the plurality of smart card slots, connecting with the application.

2. The server device of claim 1, wherein the smart card connector parameters include at least one of a buffer size or a flag indicating whether the client device supports multiple open slots.

3. The server device of claim 1, wherein iterating through the plurality of smart card slots includes:
identifying smart card types of each of the plurality of smart card slots;
filtering the plurality of smart card slots based on smart card types to produce filtered results; and
iterating through the filtered results.

4. The server device of claim 3, wherein the smart card types include embedded Secure Element (eSE) and host card emulation (HCE).

5. The server device of claim 1, wherein the plurality of smart card slots include a virtual smart card slot, a physical smart card slot, or a combination of a physical smart card slot and a virtual smart card slot.

6. The server device of claim 1, wherein the smart card protocol includes ISO/IEC 7816.

7. The server device of claim 1, wherein the application is pre-associated with the server device when the server device is initially provisioned for field service.

8. The server device of claim 7, wherein the application implements ultra-wideband technology to provide ranging data to the server device.

9. The server device of claim 7, wherein the operations comprise:
disconnecting from the Bluetooth connection with the application; and
establishing an ultra-wideband ranging session using data received from the application.

10. The server device of claim 1, wherein the application is a fine ranging application.

11. A method for discovering smart card slots in a device, the method comprising:
receiving, at a server device from a client device, over an established Bluetooth connection, smart card connector parameters, the client device having a plurality of smart card slots;
using the smart card connector parameters, iterating through the plurality of smart card slots, over the Bluetooth connection, by interrogating each slot of the plurality of smart card slots using a smart card protocol to attempt to access an application at each slot, the application pre-associated with the server device; and
in response to identifying the application exists in a slot of the plurality of smart card slots, connecting with the application.

12. The method of claim 11, wherein the smart card connector parameters include at least one of a buffer size or a flag indicating whether the client device supports multiple open slots.

13. The method of claim 11, wherein iterating through the plurality of smart card slots includes:
identifying smart card types of each of the plurality of smart card slots;
filtering the plurality of smart card slots based on smart card types to produce filtered results; and
iterating through the filtered results.

14. The method of claim 13, wherein the smart card types include embedded Secure Element (eSE) and host card emulation (HCE).

15. The method of claim 11, wherein the plurality of smart card slots include a virtual smart card slot, a physical smart card slot, or a combination of a physical smart card slot and a virtual smart card slot.

16. The method of claim 15, wherein the smart card protocol includes ISO/IEC 7816.

17. The method of claim 11, wherein the application is pre-associated with the server device when the server device is initially provisioned for field service.

18. The method of claim 17, wherein the application is a fine ranging application.

19. The method of claim 18, wherein the application implements ultra-wideband technology to provide ranging data to the server device.

20. The method of claim 11, comprising:
disconnecting from the Bluetooth connection with the application; and
establishing an ultra-wideband ranging session using data received from the application.

* * * * *